(12) United States Patent
Crudele et al.

(10) Patent No.: US 9,876,681 B2
(45) Date of Patent: *Jan. 23, 2018

(54) POLICY-BASED RESOURCE MANAGEMENT WITH TARGET-DRIVEN REMEDIATION ON SERVER

(71) Applicant: International Business Machines Corporation, Armonk, NY (US)

(72) Inventors: Michele Crudele, Rome (IT); James S. Jennings, Research Triangle Park, NC (US); Bernardo Pastorelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/194,547

(22) Filed: Jun. 27, 2016

(65) Prior Publication Data

US 2016/0308724 A1    Oct. 20, 2016

Related U.S. Application Data

(63) Continuation of application No. 13/693,800, filed on Dec. 4, 2012, now Pat. No. 9,379,937.

(30) Foreign Application Priority Data

Feb. 23, 2012   (EP) .................................... 12156624

(51) Int. Cl.
   *G06F 15/177*   (2006.01)
   *H04L 12/24*    (2006.01)

(52) U.S. Cl.
   CPC ...... *H04L 41/0893* (2013.01); *H04L 41/0813* (2013.01); *H04L 41/0889* (2013.01); *H04L 41/5009* (2013.01)

(58) Field of Classification Search
   CPC ............. H04L 41/0893; H04L 41/0813; H04L 41/0889
   (Continued)

(56) References Cited

U.S. PATENT DOCUMENTS

| 7,209,927 B2* | 4/2007 | Donatelli ............ H04L 41/0893 |
| | | 707/694 |
| 7,240,015 B1* | 7/2007 | Karmouch ............ G06F 9/4875 |
| | | 705/4 |

(Continued)

OTHER PUBLICATIONS

"EVM Control—Security, Compliance, Alerting, Policy-Based Resource, and Configuration Enforcement", May 9, 2011 [retrieved from internet on Sep. 7, 2011], http://www.manageiq.com/products/evm/evm-control.html, pp. 1-2.

(Continued)

*Primary Examiner* — Alan S Chou
(74) *Attorney, Agent, or Firm* — Yee & Associates, P.C.; Richard A. Wilhelm

(57) ABSTRACT

A resource management solution for use in a data-processing infrastructure comprising a server data-processing entity and a set of target data-processing entitiesthat is operable for downloading a set of corresponding management policies, executing a verification action indicated in each one of the corresponding management policies for verifying a compliance of the target data-processing entity with the management policy, executing a target-side remediation action indicated in each violated one of the corresponding target-side management policies which the target data-processing entity is not compliant with, for remedying the non-compliance of the target data-processing entity with the violated target-side management policy, sending an indication of a remediation request for each violated one of the corresponding server-side management policies, which each target data-processing entity is not compliant with, and executing (Continued)

by the server data-processing entity, a corresponding server-side remediation action in response to each remediation request for remotely remedying, by the server data-processing entity, the non-compliance of the corresponding target data-processing entity with the corresponding violated server-side management policy.

12 Claims, 6 Drawing Sheets

(58) Field of Classification Search
USPC .......................................................... 709/221
See application file for complete search history.

(56) References Cited

U.S. PATENT DOCUMENTS

| | | |
|---|---|---|
| 7,286,840 B2 | 10/2007 | Jain |
| 7,603,452 B1 | 10/2009 | Guo |
| 7,716,313 B2 | 5/2010 | Rana et al. |
| 7,743,008 B2 | 6/2010 | D'Alo et al. |
| 7,761,503 B2 | 7/2010 | Dhawan |
| 7,877,781 B2 | 1/2011 | Lim |
| 7,913,309 B2 | 3/2011 | Starostin et al. |
| 8,065,712 B1 | 11/2011 | Cheng et al. |
| 8,200,818 B2 | 6/2012 | Freund et al. |
| 8,271,418 B2 | 9/2012 | Allen et al. |
| 9,379,937 B2 | 6/2016 | Crudele et al. |
| 9,614,729 B2 | 4/2017 | Crudele et al. |
| 2003/0055962 A1 | 3/2003 | Freund et al. |
| 2004/0049500 A1 | 3/2004 | Donatelli et al. |
| 2004/0103310 A1 | 5/2004 | Sobel et al. |
| 2005/0172015 A1 | 8/2005 | Rana et al. |
| 2006/0020801 A1 | 1/2006 | D'Alo et al. |
| 2009/0281977 A1 | 11/2009 | Allen et al. |
| 2009/0300716 A1 | 12/2009 | Ahn |
| 2010/0063855 A1 | 3/2010 | Nguyen |
| 2010/0070970 A1 | 3/2010 | Hu et al. |
| 2011/0167101 A1 | 7/2011 | Hopen et al. |
| 2013/0227109 A1 | 8/2013 | Crudele et al. |
| 2015/0237502 A1 | 8/2015 | Schmidt |

OTHER PUBLICATIONS

"VMware vCenter Configuration Manager Policy-Driven Configuration Management and Compliance Control", Copyright 2010, http://www.vmware.com/files/pdf/VMware_vCenter_Configuration_Manager_Datasheet_English.pdf, pp. 1-2.
Stevens et al., "Policy Framework", Sep. 13, 1999, pp. 1-32.
Office Action, dated Jun. 24, 2015, regarding U.S. Appl. No. 13/693,800 28 pages.
Final Office Action, dated Jan. 14, 2016, regarding U.S. Appl. No. 13/693,800 20 pages.
Notice of Allowance, dated Mar. 31, 2016, regarding U.S. Appl. No. 13/693,800 15 pages.
Office Action, dated Apr. 27, 2015, regarding U.S. Appl. No. 13/789,835, 19 pages.
Final Office Action, dated Aug. 13, 2015, regarding U.S. Appl. No. 13/789,835, 25 pages.
Office Action, dated Mar. 10, 2016, regarding U.S. Appl. No. 13/789,835, 23 pages.
Final Office Action, dated Aug. 25, 2016, regarding U.S. Appl. No. 13/789,835, 28 pages.
Notice of Allowance, dated Nov. 23, 2016, regarding U.S. Appl. No. 13/789,835, 8 pages.

* cited by examiner

POLICY-BASED RESOURCE MANAGEMENT WITH TARGET-DRIVEN REMEDIATION ON SERVER

CROSS-REFERENCE TO RELATED APPLICATION(S)

This application is a continuation of and claims the benefit of priority to U.S. patent application Ser. No. 13/693,800, filed on Dec. 4, 2012 and entitled "Policy-Based Resource Management with Target-Driven Remediation on Server" which claims priority to European Patent Office Application No. EP 12156624.4 filed on Feb. 23, 2012, the contents of which are hereby incorporated by reference.

TECHNICAL FIELD

The solution according to one or more embodiments of the present invention relates to the data-processing field. More specifically, this solution relates to the management of data-processing infrastructures.

BACKGROUND ART

The management of data-processing infrastructures plays a key role in several contexts (for example, in large companies). For this purpose, various resource management tools are available for facilitating the management of multiple target computers (or simply targets) from a server computer (or simply server) of the data-processing infrastructure.

Particularly, resource management tools based on the concept of policies have been proposed in the last years—for example, as described in "Policy Framework" at http.//tools.ietf.org/html/draft-ietf-policy-framework-00 or in US-A-US2005/172015 (the entire disclosures of which are herein incorporated by reference). In a resource management tool of this type, a set of policies is defined (each one indicating a condition to be fulfilled by the targets to be compliant with the policy and an action to be executed for remedying their non-compliance); selected policies are then assigned to each target. The corresponding policies are enforced periodically on each target to verify the compliance of the target with them and to remedy any possible non-compliance. This reduces the administrative effort required to manage the targets, since the focus is now shifted from their management at an individual level to the definition of their policies at an aggregate level.

The enforcement of the policies may be implemented with two different approaches. In a server-based approach, the server remotely triggers the evaluation of the corresponding policies on all the targets, collects their results, and remedies any non-compliance of the targets. Conversely, in a target-base approach each target locally evaluates the corresponding policies and remedies any non-compliance with them (with the server that simply provides the policies to the targets and collects information about their compliance).

Moreover, US-A-2004/0049500 (the entire disclosure of which is herein incorporated by reference) discloses a resource management system, wherein an authority publishes rules defining target configurations of corresponding categories of subjects. Each subject provides its category to an associated helper; the helper retrieves the rules corresponding to the category of the subject, and applies these rules on it. US-A-2006/0020801 (the entire disclosure of which is herein incorporated by reference) instead discloses a self-adaptive management system, wherein an authority publishes rules defining target configurations of corresponding categories of subjects, and a supervisor publishes a current stage of a workflow of application of the rules. Each subject retrieves and applies the rules of its category corresponding to the current stage, and then publishes information about its compliance with them; once all the subjects are compliant with their rules, the supervisor updates the current stage accordingly.

The resource management tools implementing the target-based approach are the most widely used, since they allow distributing the workload throughout the targets; in this way, it is possible to reduce any bottleneck in the server, so as to obtain a very high scalability.

However, the target-based approach may be difficult (if not impossible) to apply in specific situations. Particularly, this problem may arise when the remediation of the targets should be controlled centrally—for example, for maintaining software products at correct maintenance levels. Moreover, the same problem may arise when the remediation of the targets involves interactions with external data-processing systems, where direct access by the targets may be not suitable (e.g., because of security issues) or even not feasible at all (e.g., because of technical issues)—for example, for controlling license entitlements of software products. The problem may also arise when the remediation of the targets requires the orchestration of complex activities—for example, for migrating operating systems. In other cases, it may also be preferable to concentrate some activities on the server—for example, for notifying end-users via e-mails.

SUMMARY

In its general terms, the solution according to one or more embodiments of the present invention is based on the idea of implementing target-driven remediation on the server.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a management method, wherein each target downloads corresponding policies and verifies its compliance with them. Some policies, which the target is not compliant with, are remedied by the target directly; some other policies, which the target is not compliant with, are instead remedied by the server in response to corresponding requests sent by the target.

A further aspect of the solution according to an embodiment of the invention provides a corresponding computer program (and a corresponding computer program product).

A different aspect of the solution according to an embodiment of the invention provides a corresponding data-processing system.

BRIEF DESCRIPTION OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DESCRIPTION OF EMBODIMENTS

Figure 1:
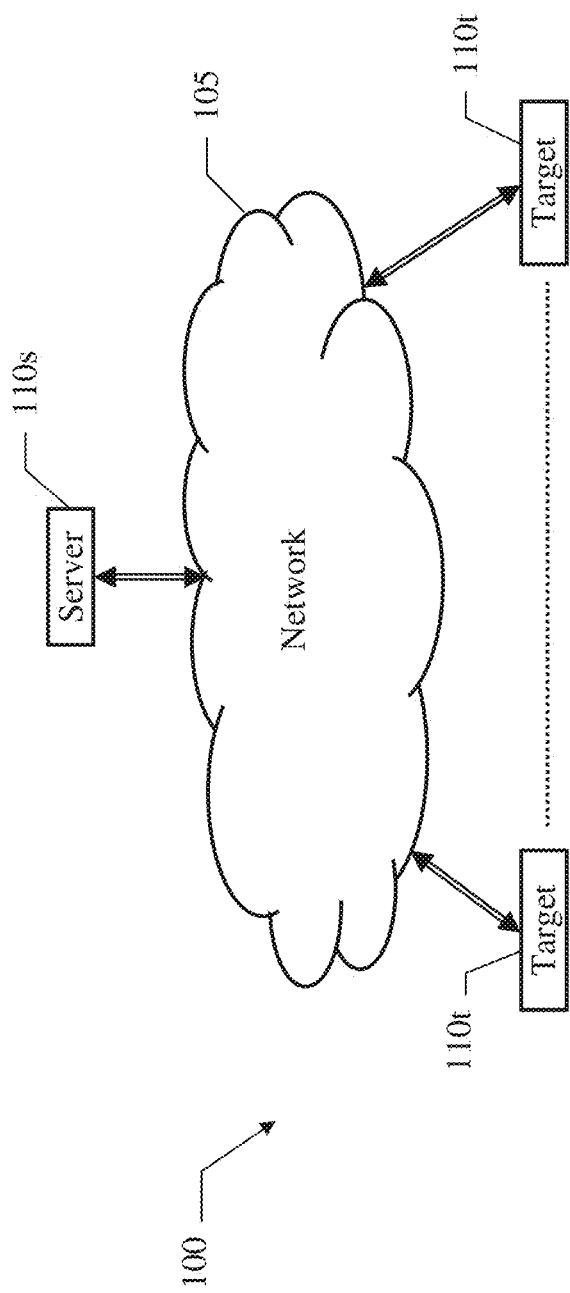
FIG. 1 shows a conceptual representation of a data-processing infrastructure in which the solution according to an embodiment of the invention may be applied.

With reference in particular to the FIG. 1, a conceptual representation is shown of a data-processing infrastructure 100 in which the solution according to an embodiment of the invention may be applied.

The data-processing infrastructure 100 has a distributed architecture, wherein multiple computers are connected one to another through a communication network 105 (for example, a LAN). One of the computers (or more), referred to as server computer (or simply server) 110s, controls the management of the other computers, referred to as target computers (or simply targets) 110t, with a policy-based mechanism (as described in detail in the following).

Figure 2:
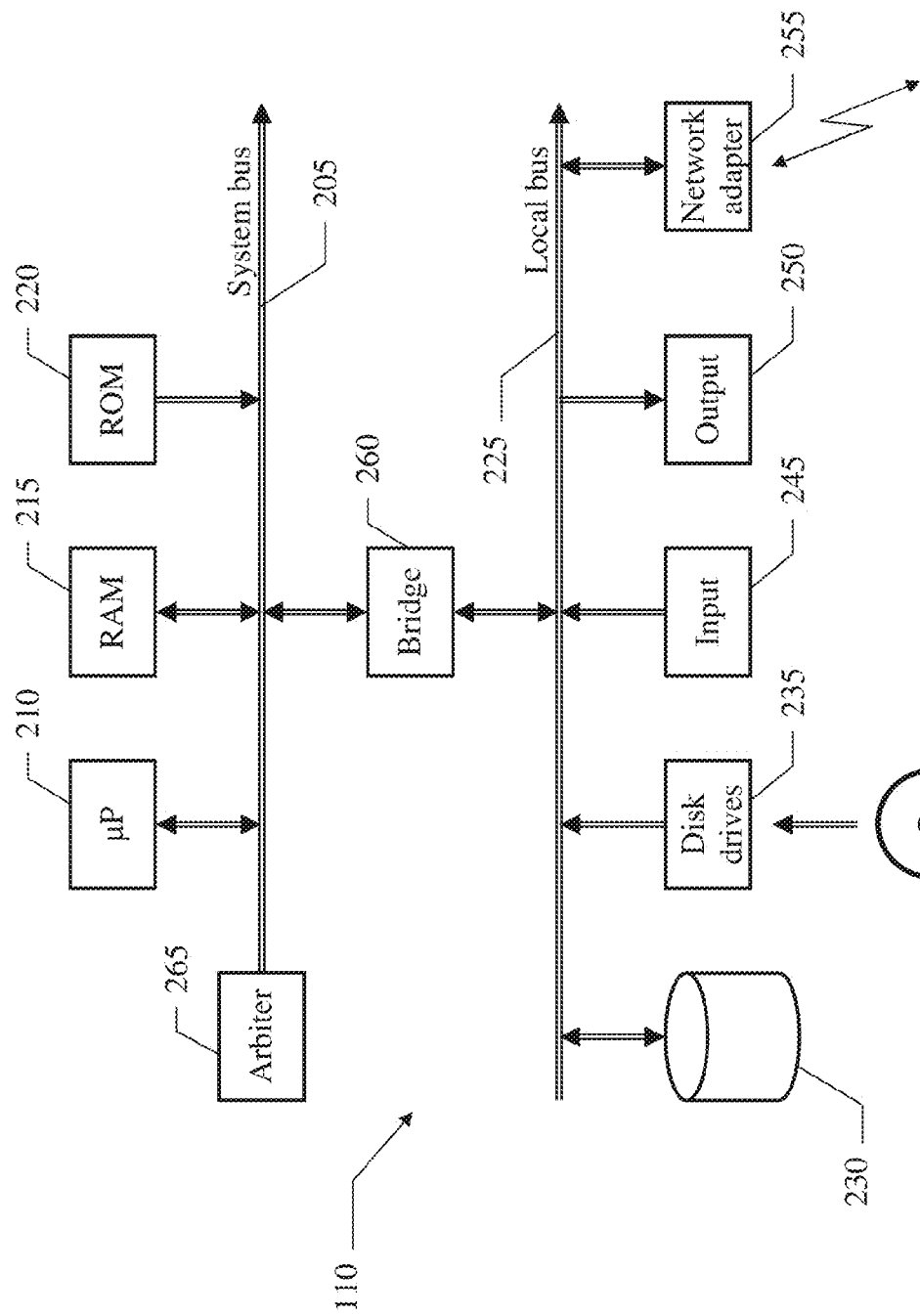
FIG. 2 shows a schematic block diagram of a computer of this data-processing infrastructure.

Moving to FIG. 2, a schematic block diagram is shown of a computer (generically denoted with the reference 110) of this data-processing infrastructure.

The computer 110 comprises several units that are connected in parallel to a system bus 205 (with a structure that is suitably scaled according to the actual function of the computer 110 in the data-processing infrastructure). In detail, one or more microprocessors (μP) 210 control operation of the computer 110; a RAM 215 is used as a working memory by the microprocessors 210, and a ROM 220 stores basic code for a bootstrap of the computer 110. Several peripheral units are clustered around a local bus 225 (by means of respective interfaces). Particularly, a mass memory comprises one or more hard disks 230 and drives 235 for reading/writing optical disks 240 (for example, CDs or DVDs). Moreover, the computer 100 comprises input units 245 (for example, a keyboard and a mouse), and output units 250 (for example, a monitor). A network adapter 255 is used to connect the computer 110 to the network (not shown in the figure). A bridge unit 260 interfaces the system bus 205 with the local bus 225. Each microprocessor 210 and the bridge unit 260 may operate as master agents requesting an access to the system bus 205 for transmitting information. An arbiter 265 manages the granting of the access with mutual exclusion to the system bus 205.

Figure 3:
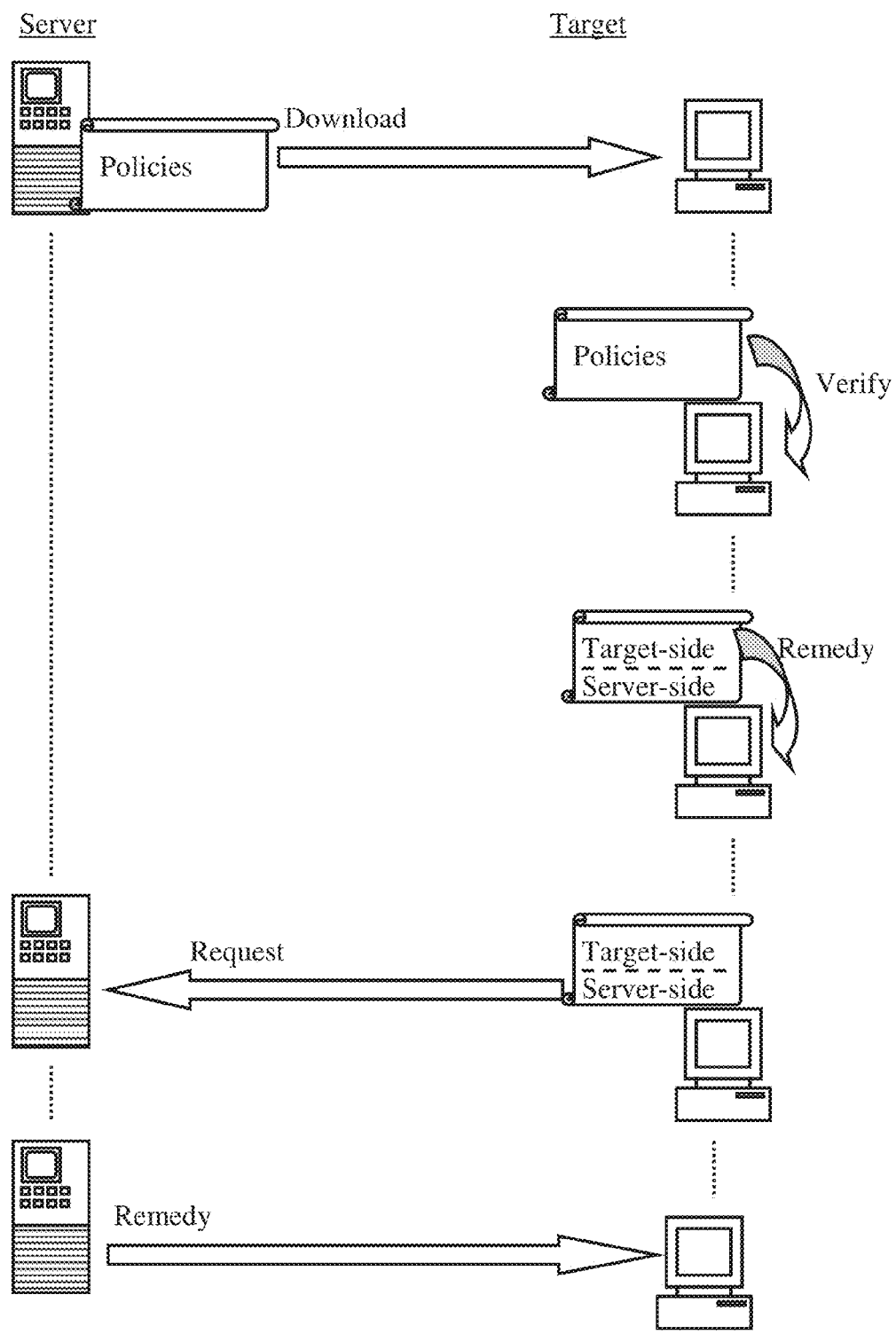
FIG. 3 shows a pictorial representation of an exemplary application of the solution according to an embodiment of the invention.

A pictorial representation of an exemplary application of the solution according to an embodiment of the invention is shown in the FIG. 3.

A generic target downloads a set of corresponding management policies (or simply policies) from the server; as described in detail in the following, each policy indicates how to verify a compliance of the target with the policy and how to remedy its possible non-compliance.

The target enforces the policies, in order to verify its compliance with each one of them.

Some of the policies (referred to as target-side policies) operate as usual. Particularly, for each target-side policy, which the target is not compliant with (referred to as violated target-side policy), the target directly remedies its non-compliance locally.

In the solution according to an embodiment of the invention, some others of the policies (referred to as server-side policies) instead operate in a different way. Particularly, in this case an indication of a corresponding remediation request is sent to the server for each server-side policy which the target is not compliant with (referred to as violated server-side policy). The non-compliance of the target with each violated server-side policy is now remedied by the server remotely, in response to the corresponding remediation request.

The above-described solution maintains most of the management activities at the target level. Particularly, each target performs the complete evaluation of the corresponding policies and starts the remediation of any violated policies locally. Moreover, the remediation of the violated policies is completed locally when it is possible (i.e., for the violated target-side policies); therefore, the target reverts to the server only when it is necessary (i.e., for completing the remediation of the violated target-side policies).

All of the above allows distributing most of the workload throughout the targets; in this way, it is possible to reduce any bottleneck in the server, so as to obtain a very high scalability. At the same time, however, this allows exploiting the integration capabilities of the server for completing the remediation activities that would be difficult (if not impossible) to execute locally.

Particularly, this solution may be advantageous for specific remediation activities that should be controlled centrally. For example, a server-side policy may be defined for maintaining a software product at a correct maintenance level. The enforcement of the policy on a target causes the target to verify whether the software product installed thereon is at the correct maintenance level. If not, the target requires the server to upgrade it; in response thereto, the server retrieves one or more patches that apply to the target (for example, according to its architecture and language) and forces the target to install them.

Moreover, the same solution may be advantageous for remediation activities that involve interactions with external data-processing systems—which direct access by the targets may be not suitable (e.g., because of security issues) or even not feasible at all (e.g., because of technical issues). For example, a server-side policy may be defined for controlling license entitlements of a specific software product. The enforcement of the policy on a target causes the target to verify whether a license entitlement for the software product is available. If not, the target requires the server to acquire it; in response thereto, the server contacts a license server and returns the acquired license entitlement to the target.

The solution may also be advantageous for remediation activities that require the orchestration of complex activities. For example, a server-side policy may be defined for migrating to a specific operating system. The enforcement of the policy on a target causes the target to verify whether it has this operating system installed. If not, the target requires the server to migrate to it; in response thereto, the server performs a back-up of the target, saves personal information, upgrades the operating system, restores the personal information, and installs the required application programs.

This solution may further be advantageous when it is preferable to concentrate some activities on the server. For example, a server-side policy may be defined for ensuring that passwords of user accounts have a proper length. The enforcement of the policy on a target causes the target to verify whether the passwords of its user accounts have this length (or more). If not, the target requires the server to inform corresponding end-users; in response thereto, the server sends an e-mail to each end-user asking him/her to update the password.

Figure 4:
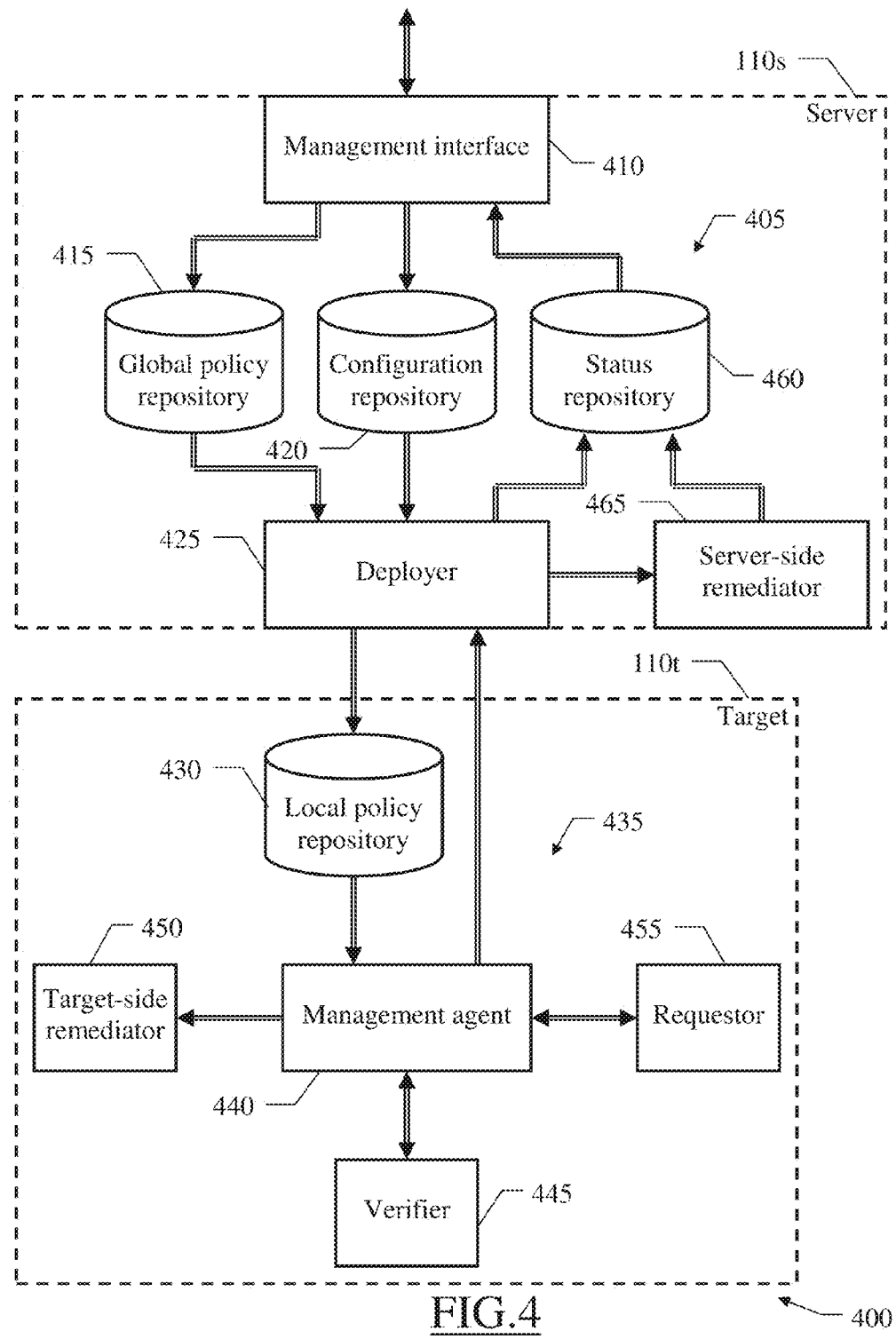
FIG. 4 shows the main software components that may be used to implement the solution according to an embodiment of the invention.

The main software components that may be used to implement the solution according to an embodiment of the invention are shown in the FIG. 4.

These software components are part of a management tool that is denoted as a whole with the reference 400. The information (programs and data) is typically stored on the hard disk and loaded (at least partially) into the working memory of each computer (i.e., server or target) when the programs are running, together with an operating system and other application programs (not shown in the figure). The programs are initially installed onto the hard disk, for example, from optical disks.

Particularly, the server 110s runs a server-component of the management tool 400 (denoted with the reference 405) for managing the corresponding targets 110t (only one shown in the figure).

Particularly, a management interface 410 (for example, a GUI or a CLI) allows a user, consisting of either a person or a software application, to define the policies to be enforced on the targets 110t (for example, to create, update, validate and delete them). For this purpose, the management interface 410 controls a global policy repository 415 that stores all the policies. Each policy comprises a verification section which defines a condition to be fulfilled by each target to be compliant with the policy, and a remediation section which defines a way to remedy the non-compliance of each target with the policy; both the verification section and the remediation section are defined at an abstract level, so as to be independent of any actual implementation of the server 110s and the targets 110t.

The management interface 410 also allows the user to define a desired configuration of each target 110t in terms of its compliance with the policies. For this purpose, the management interface 410 controls a configuration repository 420 that stores an indication of a set of policies that each target 110t (identified either explicitly by its hostname or implicitly by its category) should be compliant with.

A deployer 425 accesses both the global policy repository 415 and the configuration repository 420. For each target 110t, the deployer 425 determines the corresponding policies (as indicated in the configuration repository 420); the deployer 425 then controls the downloading of these policies (extracted from the global policy repository 415) onto the target 110t.

Moving to the target 110t, the policies downloaded from the server 110s are saved into a local policy repository 430. The target 110t runs a target-component of the management tool 400 (denoted with the reference 435) for enforcing the corresponding policies.

Particularly, for this purpose a management agent 440 accesses the local policy repository 430 for extracting the policy. The management agent 440 controls a verifier 445, which verifies whether the target 110t is compliant with the policies. Moreover, the management agent 440 controls a target-side remediator 450, which remedies the non-compliance of the target 110t with any violated target-side policies. In the solution according to an embodiment of the invention, the management agent 440 also interfaces with a requestor 455, which creates a remediation request for any violated server-side policy (possibly comprising environmental information of the target 110t, required for its remediation by the server 110s).

The management agent 440 returns the result of the verification of the compliance of the target 110t with the policies (from the verifier 445) and the possible remediation requests (from the requestor 455) to the deployer 425.

Referring back to the server-component of the management tool 405, the deployer 425 also controls a status repository 460, which stores an indication of a status of all the targets 110t in terms of compliance with the corresponding policies. Moreover, the deployer 425 controls a server-side remediator 465, which remedies the non-compliance of the targets 110t with any server-side policies in response to the corresponding remediation requests.

The management interface 410 accesses the status repository 460 so as to allow the user to monitor the management of the targets 110t (i.e., their compliance with the corresponding policies).

Figure 5A:
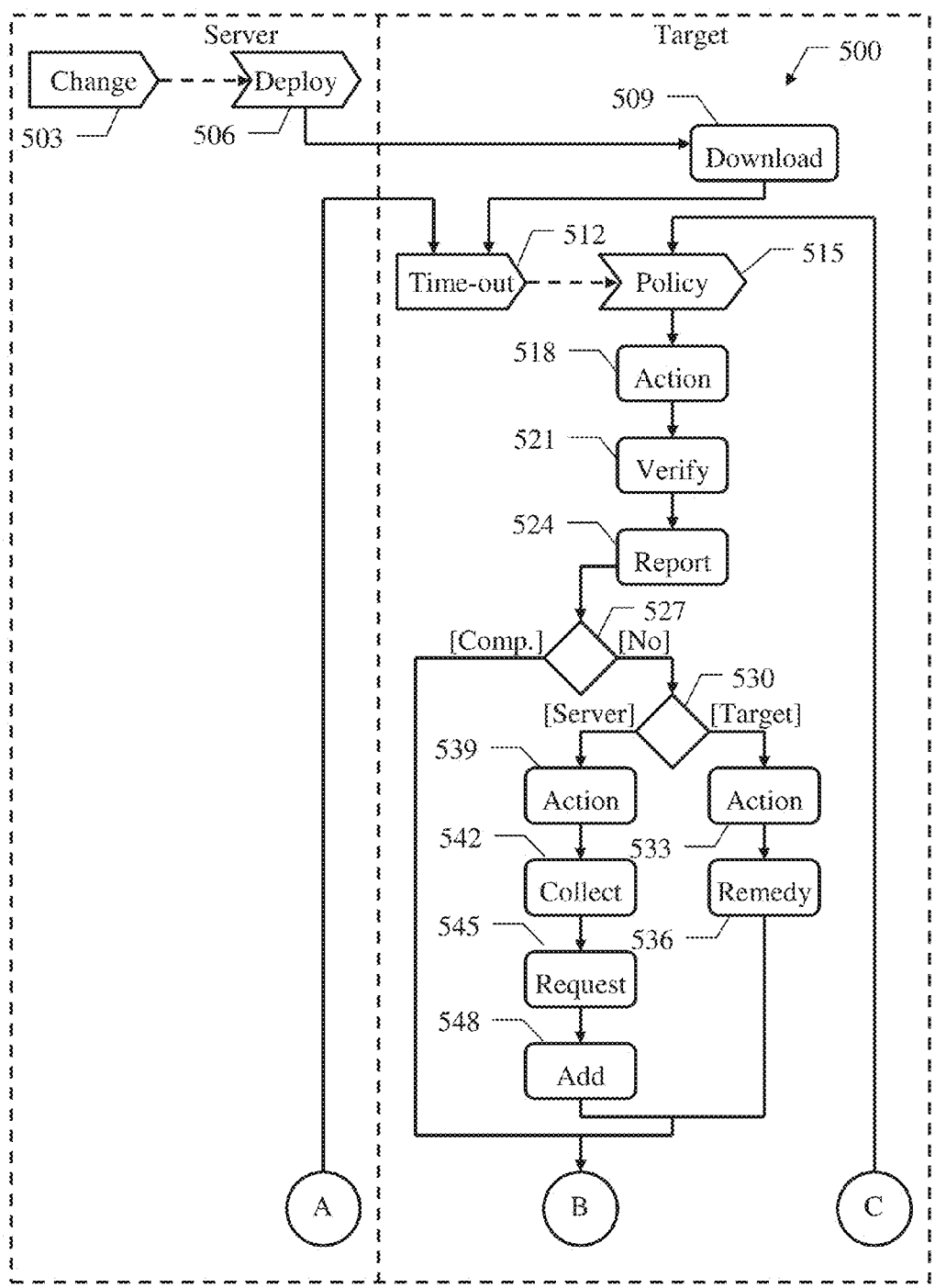
FIG. 5A-FIG. 5B show an activity diagram describing the flow of activities relating to an implementation of the solution according to an embodiment of the invention.
Figure 5B:
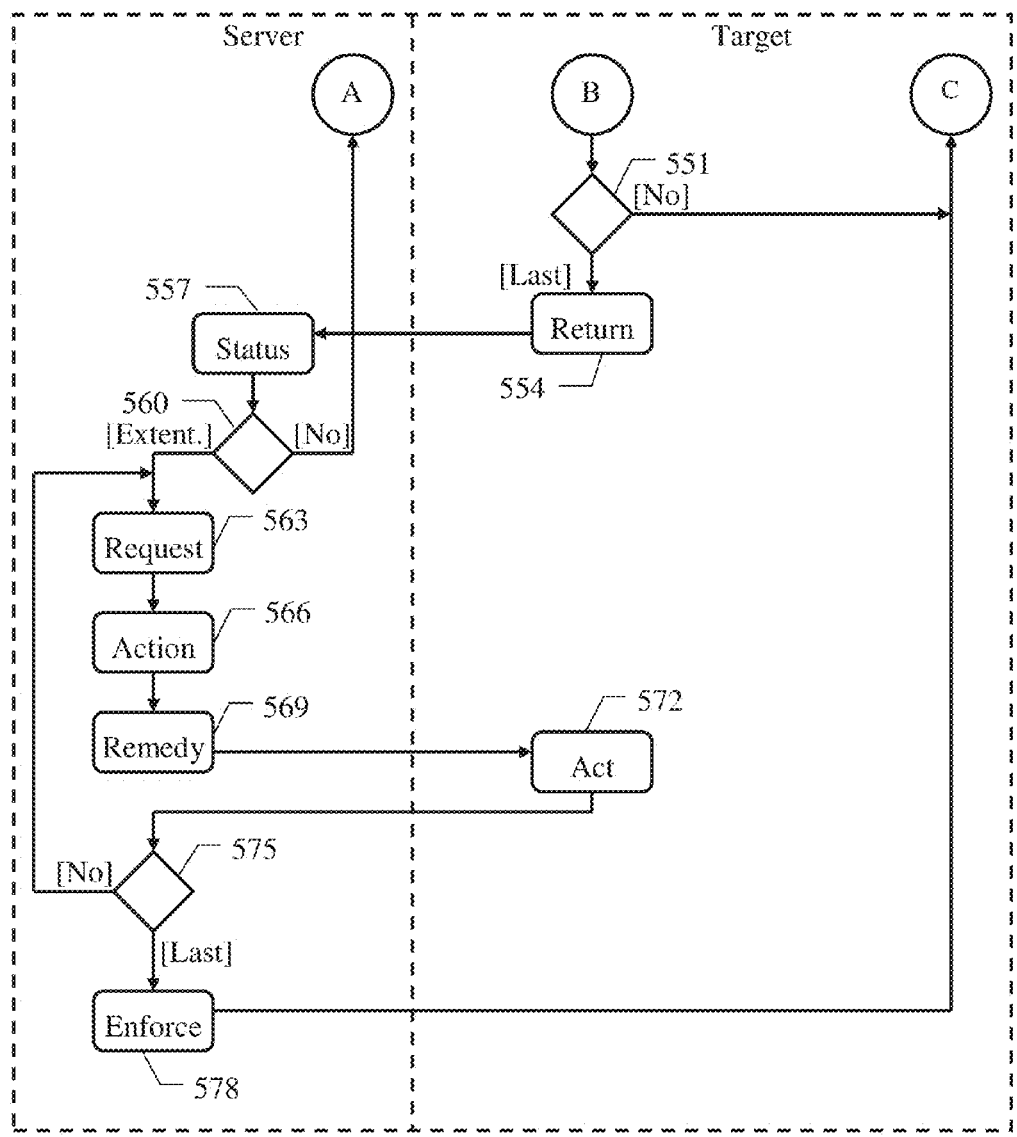

An activity diagram describing the flow of activities relating to an implementation of the solution according to an embodiment of the invention is shown in the FIG. 5A-FIG. 5B.

Particularly, the diagram represents an exemplary process that may be used to manage the data-processing infrastructure described above with a method 500.

The method 500 performs the same operations continuously. For this purpose, as soon as at block 503 any changes are entered for some policies in the global policy repository (i.e., they are created, updated or deleted) and/or any changes are entered for some configurations of the targets in the configuration repository (i.e., policies are added or removed for them), the method 500 passes to block 506. In this phase, the server triggers the deployment of the changed policies to the corresponding targets (for example, by sending corresponding commands to them).

In response thereto, each target at block 509 downloads the corresponding changed policies and saves them into its local policy repository. As soon as a predefined time-out expires at block 512 (for example, every 6-24 h), a loop is performed for enforcing all the corresponding policies on the target. The loop begins at block 515, wherein a current policy is extracted from the local policy repository (starting from the first one). Continuing to block 518, the verification section of this (current) policy is translated into a verification action, which is suitable to be actually executed on the target for verifying its compliance with the policy (for example, comprising one or more instructions depending on its implementation). The verification action is then executed on the target at block 521. An indication of the policy and of a result of the verification action (i.e., whether the target is compliant with it or not) is added to an enforcement report at block 524

The method 500 now branches at block 527 according to the result of the verification action. If the target is not compliant with this (violated) policy, the method 500 descends into block 530, wherein it further branches according to the type of the violated policy; in the case of non-compliance with a violated target-side policy the blocks 533-536 are executed, whereas in the case of non-compliance with a violated server-side policy the blocks 539-548 are executed.

Considering now the block 533 (violated target-side policy), the remediation section of the violated target-side policy is translated into a corresponding target-side remediation action, which is suitable to be actually executed on the target for remedying the non-compliance of the target with the violated target-side policy locally (for example, again comprising one or more instructions depending on its implementation). The target-side remediation action is then executed on the target at the block 536 so as to make the target compliant with this target-side policy (if possible).

Considering instead the block 539 (violated server-side policy), the remediation section of the violated server-side policy is translated into a corresponding request action, which is suitable to be actually executed on the target for requesting the server to remedy the non-compliance of the target with the violated server-side policy remotely (for example, again comprising one or more instructions depending on its implementation). The request action is then executed on the target. Particularly, the request action may comprise one ore more instructions that collect environmental information of the target at the block 542 as required for remedying its non-compliance with the violated server-side policy. For example, the environmental information may comprise a current level of a software product to be brought to a different level, a hostname of the target requiring a license entitlement for a software product, an operating system currently installed on the target to be migrated to another operating system, or a user account having a password not of the proper length. In any case, the request action comprises one or more instructions that create a corresponding remediation request for the server at the block 545, which remediation request defines a way for the server to remedy the non-compliance of the target with the violated server-side policy (at an abstract level); the remediation action is also associated with the corresponding environmental information (if any)—for example, setting corresponding parameters accordingly. Proceeding to the block 548, the remediation request (with the possible environmental information) is added to a request extension of the enforcement report.

The flow of activity merges again at block 551 (either from the block 536 or from the block 548); the same point is also reached directly from the block 527 if the target is compliant with the policy. A test is now made to determine whether the last policy (in the local policy repository) has been enforced. If not, the method 500 returns to the block 515 to repeat the same operations on a next policy. Conversely (once all the policies have been enforced), the loop is exited by descending into block 554, wherein the enforcement report with the request extension (if any) is returned to the server.

Referring back to the swim-lane of the server at block 557, the status of the target is updated according to the enforcement report in the status repository (so as to indicate its current compliance with the corresponding policies). A test is then made at block 560 to verify whether the enforcement report comprises the request extension (meaning that the target is not compliant with at least one violated target-side policy). If so, a loop is performed for each violated target-side policy. The loop begins at block 563, wherein a current remediation request with its possible environmental information is extracted from the request extension (starting from the first one). Continuing to block 566, this (current) remediation request is translated into a corresponding server-side remediation action, which is suitable to be actually executed on the server for remedying the non-compliance of the corresponding target with the corresponding violated server-side policy remotely (for example, comprising one or more instructions depending on its implementation, with possible parameters being set according to the corresponding environmental information). The server-side remediation action is then executed on the server at block 569. Particularly, the server-side remediation action may comprise one or more instructions that interact with external computers (not shown in the figure); in any case, the server-side remediation action comprises one or more instructions that act on the target for making it compliant with the server-side policy (if possible) at block 572. A test is now made at block 575 to determine whether the last remediation request (in the request extension of the enforcement report) has been processed. If not, the method returns to the block 563 to repeat the same operations on a next remediation request. Conversely (once all the remediation requests have been processed), the loop is exited by descending into block 578, wherein the server instructs the target to enforce the corresponding violated target-side policies. For this purpose, the method 500 returns to the block 515 (to repeat the same operations described above for the violated target-side policies only). In this way, the discovering and reporting of the compliance of the target with the violated server-side policies is performed immediately (without the need of waiting until the next expiration of the corresponding time-out). This ensures that the status repository is maintained up-to-date substantially in real-time. Referring back to the block 560, if the enforcement report does not comprise the request extension (meaning that the target is compliant with all the target-side policies), the flow of activity directly returns to the block 512 in order to wait for a next expiration of the time-out.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items); the terms based on, dependent on, according to, function of (and any forms thereof) should be intended as a non-exclusive relationship (i.e., with possible further variable involved); and the term a/an should be intended as one or more items (unless expressly indicated otherwise).

For example, an embodiment of the present invention provides a management method; the management method is for use in a data-processing infrastructure comprising a server data-processing entity and a set of (one or more) target data-processing entities (of any type, see below). The method comprises the following steps. A set of (one or more) corresponding management policies is downloaded from the server data-processing entity onto each target data-processing entity; the management policies of at least one of the target data-processing entities comprise a subset of (one or more) server-side management policies and a subset of (one or more) target-side management policies (of any type, see below). A verification action (indicated in each one of the corresponding management policies) is executed under the control of each target data-processing entity; the verification action is for verifying a compliance of the target data-processing entity with the management policy. A target-side remediation action (indicated in each violated one of the corresponding target-side management policies, which the target data-processing entity is not compliant with) is executed under the control of each target data-processing entity; the target-side remediation action is for remedying the non-compliance of the target data-processing entity with the violated target-side management policy. An indication of a remediation request is sent (from each target data-processing entity to the server data-processing entity) for each violated one of the corresponding server-side management policies which the target data-processing entity is not compliant with (in any way, see below). A corresponding server-side remediation action is executed, under the control of the server data-processing entity, in response to each remediation request (in any way, see below); the server-side remediation action is for remedying the non-compliance of the corresponding target data-processing entity with the corresponding violated server-side management policy.

However, similar considerations apply if the same solution is implemented with an equivalent management method (by using similar steps with the same functions of more steps or portions thereof, removing some steps being non-essential, or adding further optional steps); moreover, the steps may be performed in a different order, concurrently or in an interleaved way (at least in part).

In any case, the above-described applications of the management method are merely illustrative and in no way limitative. For example, the same management method may be used to provide access to a virtualized application (with a server-side policy for requesting a virtualized application manager to deploy the virtualized application, configure the target, and add it to a corresponding access control list), to migrate from a legacy management system to a policy-based management system (with a server-side policy for using the legacy management system until the migration has been completed), to control license entitlements of software products in real-time (with a server-side policy for authorizing the use of a software product according to a residual number of instances thereof that may be further used in the whole data-processing infrastructure), to ensure that all the user accounts are protected by password (with a server-side policy for notifying corresponding end-users via e-mails), and the like.

Moreover, the management policies may have any structure—for example, with the verification action and/or the target-side remediation action that may be indicated in each policy directly with the corresponding instructions executable on the targets. The management policies may also be downloaded onto each target data-processing entity in any other way (for example, with the target data-processing entity that periodically checks their availability in a corresponding depot). In addition, the remediation requests may be indicated in any other way (for example, simply by an identifier of the corresponding violated server-side policies or directly by the corresponding server-side remediation actions).

In an embodiment of the invention, the step of sending an indication of a remediation request comprises the following operations. Environmental information is collected on the target data-processing entity for the violated server-side management policy; the environmental information is associated with the remediation request. The step of executing a corresponding server-side remediation action then comprises executing the server-side remediation action according to the associated environmental information.

However, the environmental information may be of any other type (for example, indicating a processing power of the target); moreover, the environmental information may be associated with the corresponding target-side remediation action in any way (for example, by directly updating its definition), and it may be used by the server in any way (even simply for reporting purposes). In any case, this feature is not always necessary (with some server-side remediation actions that may be executed without the need of any environmental information).

In an embodiment of the invention, the step of sending an indication of a remediation request comprises executing (under the control of the target data-processing entity) a request action indicated in the violated server-side management policy; the request action comprises at least one instruction for creating the remediation request.

However, in this case as well, the request action may be indicated in the policy in any way (for example, directly with the corresponding instructions executable on the targets).

In an embodiment of the invention, the step of executing a request action comprises executing at least one further instruction comprised in the request action for collecting the environmental information.

However, the environmental information may be collected in any other way (for example, by means of dedicated scanners).

In an embodiment of the invention, the management method further comprises the step of sending an enforcement report from each target data-processing entity to the server data-processing entity; the enforcement report comprises an indication of a result of the verification of the compliance with the corresponding management policies. The step of sending an indication of a remediation request then comprises adding an indication of the remediation request to the enforcement report.

However, the enforcement report may comprise different or additional information (for example, an indication of any target-side remediation actions being executed and their results); in any case, the server-side remediation actions may be sent to the server in any way (even independently of any enforcement report)—for example, with the server data-processing entity that polls the target data-processing entities for retrieving them.

In an embodiment of the invention, the step of sending an indication of a remediation request comprises adding the environmental information to the enforcement report in association with the remediation request.

However, in this case as well, the environmental information may be sent to the server in any way (even independently of any enforcement report as above).

In an embodiment of the invention, the step of executing a verification action comprises triggering the execution of the verification action indicated in each corresponding management policy in response to the expiration of a periodic time-out on the target data-processing entity.

However, the time-out may have any value and it may be set in any way (for example, pre-defined for all the targets or set individually by the server); in any case, the verification of the policies may be scheduled in any other way (even by the server).

In an embodiment of the invention, the management method further comprises the step of causing the execution of the verification action indicated in each violated server-side management policy (on the corresponding target data-processing entity) in response to the execution of the corresponding server-side remediation action.

However, the possibility of verifying the violated server-side policies always periodically (together with all the other policies) is not excluded.

Another embodiment of the present invention provides a management method for use in a data-processing infrastructure comprising a server data-processing entity and a set of target data-processing entities. The method comprises the following steps under the control of the server data-processing entity. A set of corresponding management policies is downloaded onto each target data-processing entity (with the management policies of at least one of the target data-processing entities that comprise a subset of server-side management policies and a subset of target-side management policies), so as to cause the target data-processing system to execute a verification action (indicated in each one of the corresponding management policies) for verifying a compliance of the target data-processing entity with the management policy, and to execute a target-side remediation action (indicated in each violated one of the corresponding target-side management policies, which the target data-processing entity is not compliant with) for remedying the non-compliance of the target data-processing entity with the violated target-side management policy. An indication of a remediation request is received (from each target data-processing entity) for each violated one of the corresponding server-side management policies, which the target data-processing entity is not compliant with. A corresponding server-side remediation action is executed in response to each remediation request (for remedying the non-compliance of the corresponding target data-processing entity with the corresponding violated server-side management policy).

Similar considerations apply to this management method (under the control of the server data-processing entity) as set out above for the overall management method (executed on the whole data-processing infrastructure).

Another embodiment of the present invention provides a management method for use in a data-processing infrastructure comprising a server data-processing entity and a set of target data-processing entities. The method comprises the following steps under the control of each target data-processing entity. A set of management policies is downloaded from the server data-processing entity (with the management policies that comprise a subset of server-side management policies and a subset of target-side management policies). A verification action (indicated in each one of the management policies) is executed for verifying a compliance of the target data-processing entity with the management policy. A target-side remediation action (indicated in each violated one of the target-side management policies, which the target data-processing entity is not compliant with) is executed for remedying the non-compliance of the target data-processing entity with the violated target-side management policy. An indication of a remediation request is sent (to the server data-processing entity) for each violated one of the server-side management policies which the target data-processing entity is not compliant with, so as to cause the server data-processing system to execute a corresponding server-side remediation action in response to each remediation request (for remedying the non-compliance of the target data-processing entity with the corresponding violated server-side management policy).

Similar considerations apply to this management method (under the control of the target data-processing entity) as set out above for the overall management method (executed on the whole data-processing infrastructure).

Another embodiment of the present invention provides a computer program; the computer program comprises code means for causing a data-processing system (i.e., the whole data-processing infrastructure, the server data-processing entity alone, or a single target data-processing entity alone—of any type, see below) to perform the steps of the above-mentioned management method when the computer program is executed on the data-processing system.

However, the same solution may be implemented as a stand-alone module, as a plug-in for the resource management tool, or even directly in the resource management tool itself. In any case, similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). The program may take any form suitable to be used by any data-processing system or in connection therewith (for example, within a virtual machine), thereby configuring the system to perform the desired operations; particularly, the program may be in the form of external or resident software, firmware, or micro-code (either in object code or in source code—for example, to be compiled or interpreted). Moreover, it is possible to provide the program on any computer-usable medium (and particularly as an article of manufacture on a non-transitory medium); the medium may be any element suitable to contain, store, communicate, propagate, or transfer the program. For example, the medium may be of the electronic, magnetic, optical, electromagnetic, infrared, or semiconductor type; examples of such medium are fixed disks (where the program may be pre-loaded), removable disks, tapes, cards, wires, fibers, wireless connections, networks, broadcast waves, and the like. In any case, the solution according to an embodiment of the present invention lends itself to be implemented even with a hardware structure (for example, integrated in a chip of semiconductor material), or with a combination of software and hardware suitably programmed or otherwise configured.

Another embodiment of the present invention provides a data-processing system (i.e., the whole data-processing infrastructure, the server data-processing entity alone, or a single target data-processing entity alone); the data-processing system comprises means for performing the steps of the above-mentioned management method.

However, similar considerations apply if the data-processing system has a different structure or comprises equivalent components, or it has other operative characteristics. In any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and it may be either direct or indirect through one or more intermediaries. In any case, each computer (of the server data-processing entity and/or the target data-processing entities) may have another structure or may comprise similar elements (such as cache memories temporarily storing the programs or parts thereof); moreover, it is possible to replace the computer with any code execution entity, either based on a physical machine or a virtual machine (such as a desktop, a PDA, a mobile phone, and the like). The same solution may also be applied in a data-processing infrastructure comprising more server data-processing entities (for example, for corresponding sets of target data-processing entities), or based on a different architecture (for example, a global, wide area, cellular or satellite network), and exploiting any type of (wired and/or wireless) connections. In any case, the application of the same solution in a stand-alone computer hosting virtual machines implementing the server data-processing entity and the target data-processing entities is not excluded.

The invention claimed is:

1. A data-processing system comprising a microprocessor coupled to a memory having program code stored therein that is operable to perform, when the program code is executed on the data-processing system, the steps of:
   downloading, from a server data-processing entity onto each target data-processing entity of a set of target data-processing entities, a set of corresponding management policies, the management policies of at least one of the target data-processing entities comprising a subset of server-side management policies and a subset of target-side management policies;
   executing, under the control of each target data-processing entity, a verification action indicated in each one of the corresponding management policies for verifying a compliance of the target data-processing entity with the management policy;
   executing, under the control of each target data-processing entity, a target-side remediation action indicated in each violated one of the corresponding target-side management policies which the target data-processing entity is not compliant with, for remedying the non-compliance of the target data-processing entity with the violated target-side management policy;
   sending, from each target data-processing entity to the server data-processing entity, an indication of a remediation request for each violated one of the corresponding server-side management policies which the target data-processing entity is not compliant with; and
   executing, by the server data-processing entity, a corresponding server-side remediation action in response to each remediation request for remotely remedying, by the server data-processing entity, the non-compliance of the corresponding target data-processing entity with the corresponding violated server-side management policy.

2. The data-processing system according to claim 1, wherein the step of sending the indication of the remediation request comprises:
   collecting environmental information on the target data-processing entity for the violated server-side management policy; and
   associating the environmental information with the remediation request; wherein the step of executing the corresponding server-side remediation action comprises:
   executing the server-side remediation action according to the associated environmental information.

3. The data-processing system according to claim 2, wherein the step of sending the indication of the remediation request comprises:
   executing, under the control of the target data-processing entity, a request action indicated in the violated server-side management policy, the request action comprising at least one instruction for creating the remediation request.

4. The data-processing system according to claim 3, wherein the step of executing the request action comprises:
   executing at least one further instruction comprised in the request action for collecting the environmental information.

5. The data-processing system according to claim 2, further comprising the step of:
   sending an enforcement report, comprising an indication of a result of the verification of the compliance with the corresponding management policies, from each target data-processing entity to the server data-processing entity, wherein the step of sending the indication of a remediation request comprises:
   adding an indication of the remediation request to the enforcement report.

6. The data-processing system according to claim 5, wherein the step of sending the indication of the remediation request comprises:
   adding the environmental information to the enforcement report in association with the remediation request.

7. The data-processing system according to claim 1, wherein the step of executing a verification action comprises:
   triggering the execution of the verification action indicated in each corresponding management policy in response to the expiration of a periodic time-out on the target data-processing entity.

8. The data-processing system according to claim 1, further comprising the step of:
   causing the execution of the verification action indicated in each violated server-side management policy on the corresponding target data-processing entity in response to the execution of the corresponding server-side remediation action by the server data-processing entity.

9. The data-processing system according to claim 1, wherein the step of executing a corresponding server-side remediation action by the server data-processing entity comprises:
   translating, by the server data-processing entity, the remediation request into the corresponding server-side remediation action.

10. A data-processing system comprising a microprocessor coupled to a memory having program code stored therein that is operable to perform, when the program code is executed on the data-processing system, the steps of:
    downloading, onto each target data-processing entity of a set of target data-processing entities, a set of corresponding management policies, the management policies of at least one of the target data-processing entities comprising a subset of server-side management policies and a subset of target-side management policies, to cause the target data-processing system to execute a verification action indicated in each one of the corresponding management policies for verifying a compliance of the target data-processing entity with the management policy, and to execute a target-side remediation action indicated in each violated one of the corresponding target-side management policies, which the target data-processing entity is not compliant with, for remedying the non-compliance of the target data-processing entity with the violated target-side management policy;

receiving, from each target data-processing entity, an indication of a remediation request for each violated one of the corresponding server-side management policies, which the target data-processing entity is not compliant with; and executing a corresponding server-side remediation action, in response to each remediation request, for remotely remedying by the data-processing the non-compliance of the corresponding target data-processing entity with the corresponding violated server-side management policy.

11. The data-processing system according to claim 10, wherein the step of executing a corresponding server-side remediation action comprises:

translating, by the data-processing system, the remediation request into the corresponding server-side remediation action.

12. A data-processing system comprising a microprocessor coupled to a memory having program code stored therein that is operable to perform, when the program code is executed on the data-processing system, the steps of:

downloading, from a server data-processing entity, a set of management policies, the management policies comprising a subset of server-side management policies and a subset of target-side management policies;

executing a verification action indicated in each one of the management policies for verifying a compliance of the data-processing system with the management policy;

executing a target-side remediation action indicated in each violated one of the target-side management policies, which the data-processing system is not compliant with, for remedying the non-compliance of the data-processing system with the violated target-side management policy; and sending, to the server data-processing entity, an indication of a remediation request for each violated one of the server-side management policies which the data-processing system is not compliant with, to cause the server data-processing entity to execute a corresponding server-side remediation action, in response to each remediation request, for remotely remedying by the server data-processing entity the non-compliance of the data-processing system with the corresponding violated server-side management policy.

* * * * *